UNITED STATES PATENT OFFICE.

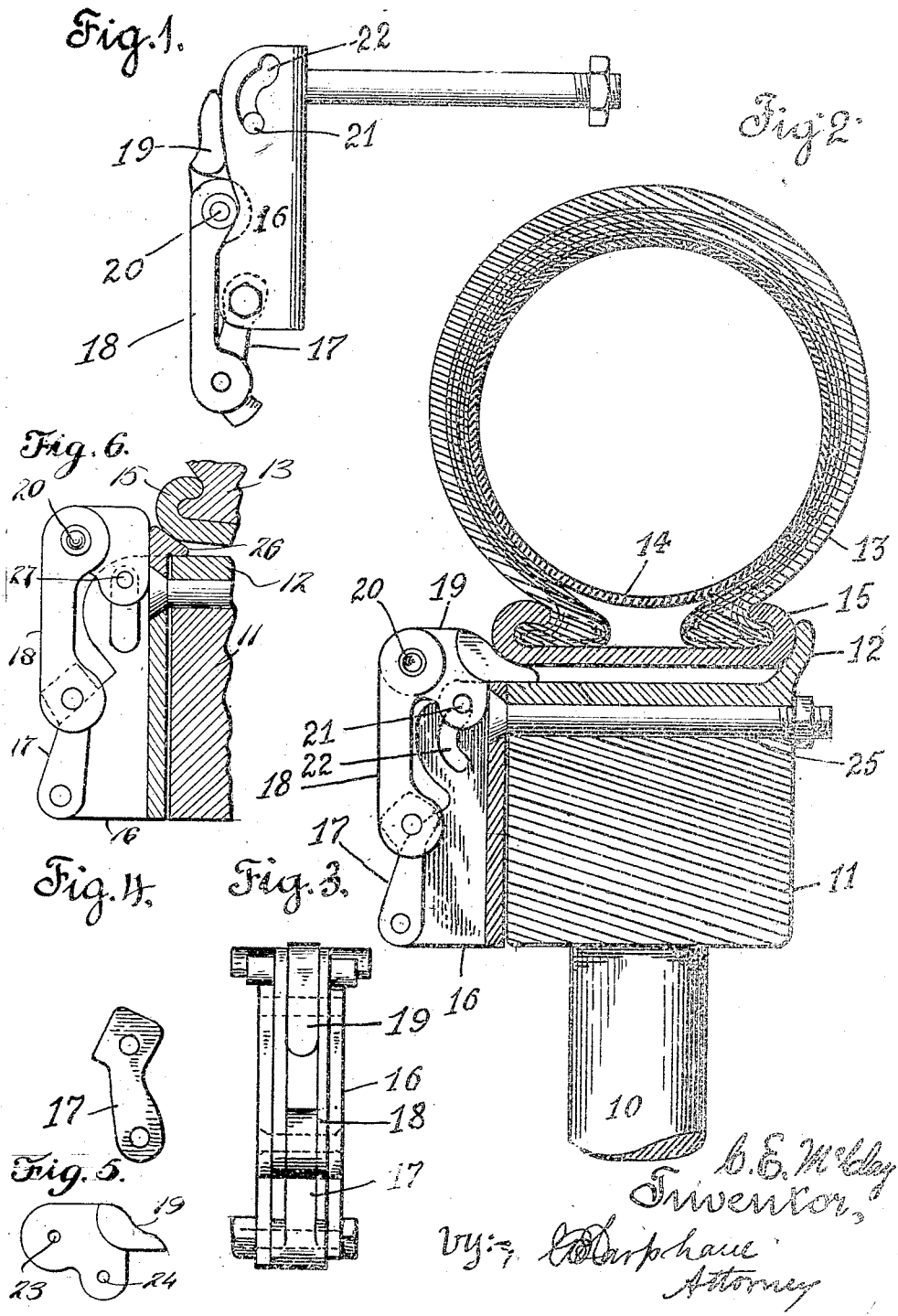

CHARLES E. McCLAY, OF LOS ANGELES, CALIFORNIA.

DEMOUNTABLE-RIM-SECURING DEVICE.

1,257,264.   Specification of Letters Patent.   Patented Feb. 19, 1918.

Application filed August 15, 1917. Serial No. 186,276.

*To all whom it may concern:*

Be it known that I, CHARLES E. McCLAY, a citizen of the United States, residing at the city of Los Angeles, county of Los Angeles, State of California, have invented new and useful Improvements in Demountable-Rim-Securing Devices, of which the following is a specification.

My invention relates to means for securing a demountable rim upon a vehicle wheel and the object thereof is to provide a device for that purpose whose parts are all connected and by the use of which a rim may be quickly attached upon or detached from the felly.

In the drawings forming a part of this application:

Figure 1. Is a side view of my device in its inoperative position and detached from the wheel.

Fig. 2. Is a section of a portion of a wheel showing my device in its inoperative position, one side of the casing being removed for clearness of illustration.

Fig. 3. Is an end view of the device in its operative position detached from the wheel.

Figs. 4 and 5 are views of detached parts.

Fig. 6 is a section of a portion of a wheel and the casing showing a slight modification of my device.

Referring to the drawings: 10 is the spoke, 11 the felly and 12 the felly rim, all of any approved construction. 13 is the outer casing, 14 the inner tube and 15 the metal tire rim.

My rim securing device consists of the following parts; to wit, a U-shaped metal casing 16 in the inner end of which is pivotally mounted a short link 17. A longer link 18 is pivotally connected at its inner end to link 17. The outer end of link 18 is pivotally connected to the rear end of head 19 by pivot pin 20 which projects on each side of the link a distance equal to the thickness of the metal comprising the casing. Head 19 is also pivotally connected to the casing by pivot pin 21 which projects through slots 22 in the casing so that the outer ends of the pin are flush with the outer faces of the casing. Slots 22 could be straight as shown by slot 27 in Fig. 6. Pin 20 passes through hole 23 and pin 21 passes through hole 24 in head 19. These holes are shown in Fig. 5. The outer end of link 17 is preferably rectangular as shown in Fig. 4, to receive a wrench to operate the head when attaching or detaching a tire. A bolt 25 which passes through holes in the casing and felly secures the casing to the felly.

After the casing is secured to the felly the head is thrown to its inoperative position as shown in Fig. 1. The demountable rim is then positioned on the felly rim and the head is then positioned by forcing its nose between the felly rim and the demountable rim. There are as many of these devices as may be required. When the head is positioned the center of the pivot between the links passes a little nearer to the felly than the center of the pivot which connects the shorter link to the casing thereby locking the head properly positioned. The rectangular shape of the outer end of the shorter link enables the operator to place a wrench thereon to position the head, and also to release it when desired, thereby making the action of putting on or taking off the demountable rim very easy of accomplishment with the minimum consumption of time. As all the parts are connected and securely held on the felly there is no danger of losing any of the parts of my securing device, and they are ready and in place for use when wanted.

In some wheels there is a wedge ring which enters between the demountable rim and felly rim. When such rings are used the nose would be cut off on the plane of the outer face of the wedge ring when positioned for use as shown in Fig. 6.

Having described my invention I claim:

1. A demountable rim securing device comprising, a U-shaped metal casing having slots in its sides near the outer end thereof; means to secure said casing to a felly; a shorter link pivotally mounted in the inner end of said casing; a longer link pivotally secured to the outer end of the shorter link; and a head pivotally secured to said longer link and to the outer end of the casing, the pivot connecting said head and casing working in the slot in the casing, and the pivot connecting the head and casing passing to the outer face of the casing and being adapted to slide on the edges of the casing when the head is moved.

2. A demountable rim securing device comprising a casing adapted to be secured upon the felly of a vehicle wheel, said casing having slots in the sides thereof; a toggle mounted in said casing, a head pivotally connected to said toggle, and a pin in said head projecting into the slots in the casing.

In witness that I claim the foregoing I have hereunto subscribed my name this 9th day of August, 1917.

CHARLES E. McCLAY.